United States Patent Office 3,192,216
Patented June 29, 1965

3,192,216
PHENYLHYDROXYALKYLPYRIMIDINE COMPOUNDS
Allan Poe Gray and Donald Elmer Heitmeier, Decatur, Ill., assignors to Neisler Laboratories, Inc., Decatur, Ill., a corporation of Delaware
No Drawing. Filed Oct. 30, 1961, Ser. No. 148,716
6 Claims. (Cl. 260—256.4)

This is a continuation in part of our copending application, S.N. 66,431, filed November 1, 1960, and now abandoned, entitled "Phenyl-amino Alkanes and Process."

This invention relates to compositions of matter classified in the art of chemistry as N-substituted β-aralkyl-amines and processes for making and using such compositions.

The invention sought to be patented, in its composition aspect, is described as residing in the concept of a chemical compound having a molecular structure in which there is attached, to the amino nitrogen atom of a β-hydroxyphenethylamine, a polyhetero-monocyclicaryl moiety having five or six ring atoms, two or three of which are hetero atoms consisting of one to three nitrogen atoms and not more than one oxygen atom and not more than one sulfur atom, by a ring atom of said moiety. Such compositions will hereinafter be identified as N-(polyhetero-monocyclicaryl)-β-hydroxyphenethylamines.

The invention sought to be patented, in the process of making aspect, resides in the concept of embodying such a molecular structure in tangible form by linking a polyhetero-monocyclicaryl moiety and a β-hydroxyphenethyl group through an otherwise unsubstituted trivalent nitrogen atom by (1) the reaction of a polyhetero-monocyclicarylamine with (a) a styrene oxide or (b) a styrene halohydrin, or (c) a phenylglycolic acid derivative with subsequent reduction of the resultant amide with a suitable reducing agent; or, alternatively, by (2) the reaction of the halide, thiol, thioether or methyl sulfone derivative of a polyhetero-monocyclicaryl compound with a β-hydroxyphenethylamine.

The invention sought to be patented, in the process of using aspect, is described as residing in the concept of using the tangible embodiment of a composition of matter identified as an N-(polyhetero-monocyclicaryl)-β-hydroxyphenethylamine, by administering to a human being such composition as the essential active ingredient of a pharmaceutical formulation for the application of the relief of pain to human beings.

The tangible embodiments of the composition aspect of the invention in their free base form are white crystalline solids; have low aqueous solubility; and, are soluble in polar organic solvents, for example, lower aliphatic alcohols. Examination of the compounds produced according to the herein described process reveals physical characteristics such as ultraviolet and infrared spectra and pKa values which are compatible with the structure of the compositions herein set forth. The aforementioned physical characteristics, taken together with the nature of the analytical results, starting materials and the mode of synthesis, are in accord with the structure of the compositions sought to be patented.

The tangible embodiments of this invention all possess the inherent applied use characteristic of relieving pain in animal organisms. Standard pharmacological evaluations indicate the compounds to be useful, as well, as muscle relaxants, analgesics, sedatives, tranquilizers, or anti-inflammatory agents. A common result of the use of substances having such properties is that of the relief of pain associated with the conditions indicated. In addition, some of the compounds possess central nervous system stimulant and anorexigenic activity.

The free base compounds of the present invention have the generalized structure

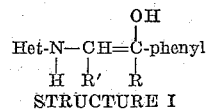

STRUCTURE I wherein "Het" represents a polyhetero-monocyclicaryl moiety and "R" represents hydrogen, lower-alkyl, benzyl, and phenyl, and "R'" represents H and methyl.

As used herein, the term "lower-alkyl" means alkyl radicals having 1 to 4 carbon atoms, inclusive, either straight or branched chain, among which are, for purposes of illustration, but without limiting the generality of the foregoing, methyl, ethyl, n-propyl, n-butyl, isopropyl, isobutyl, secondary-butyl, and tertiary-butyl.

The term "polyhetero-monocyclicaryl," as used herein, means a monocyclic ring system containing five or six essentially coplanar ring atoms, two or three of which must be hetero atoms, of the formula $C_mN_nX_y$, where X represents a bivalent oxygen or sulfur atom, where $m$ is at least 2 and not more than 4, $n$ is at least 1 and not more than 3, and, $y$ is not more than 1; the nucleus of said ring system possessing 6 pi electrons. The presence of 6 pi electrons in a monocyclic coplanar ring system is a fundamental quantum mechanical criterion of aromaticity as taught in the modern text-books of organic chemistry. See, for example, the treatment by G. A. Wheland in his book Resonance in Organic Chemistry, John Wiley and Sons, New York (1955), especially at pages 144 through 147. For purposes of illustration, but without limiting the generality of the foregoing, the imidazole, isoxazole, oxadiazole, oxazole, pyrazole, thiadiazole, thiazole, triazole, triazine, pyrimidine, pyridazine and pyrazine rings have six pi electrons participating in resonance interaction in the ring system.

The above definition of polyhetero-monocyclicaryl may be summarized by describing polyhetero-monocyclicaryl as an aromatic radical containing five to six ring atoms, two to three of which must be hetro atoms. Implicit in this definition are all of the attributes herein above described, i.e., the coplanar monocyclic ring system containing 6 pi electrons. The ring systems meeting these requirements are known to those skilled in the art of organic chemistry.

The phenyl moiety and the polyhetero-monocyclicaryl moiety include, for purposes of illustration but without limiting the generality of the foregoing, as the full equivalent of each, respectively, the unsubstituted phenyl radical and the unsubstituted polyhetero-monocyclicaryl radical, and such radicals bearing on the ring, in place of a hydrogen atom or atoms, one or more simple substituents not adversely affecting the hereinbefore described pharmacological properties of the above generalized structure, such as halo (see Examples 18, 20, 26, 42), lower-alkyl (see Examples 5, 23, 24, 41, 50), lower alkoxy (see Examples 16, 19, 25), methylenedioxy, amino (see Examples 22, 40, 45), nitro (see Example 22), trihalomethyl (see Example 21), hydroxy (see Examples 17, 38), mercapto (see Eample 36), lower-alkylthio (see Example 37), carboxy (see Example 27), and other groups commonly used in the art as aromatic substituents.

Any oxy derivative convertible to a hydroxy compound of the present invention after introduction into an animal organism is regarded by the inventors as the full equivalent of the compounds as represented in the above generalized structure. Oxy derivatives intended to be included are, for purposes of illustration but without limiting the generality of the foregoing: esters which are produced from the hydroxy compounds of this invention and an acylating agent, such as those derived from a monocarboxylic acid, dicarboxylic acid or carbamic acid; and, oxazolidine derivatives which are produced from the β-hydroxyphenethylamino compounds of this invention and an aldehyde or ketone. Acids from which ester derivatives of the compounds of this invention can be derived include, for purposes of illustration but without limiting the generality of the foregoing: lower-alkanoic acids (see Examples 30 and 32), formic acid (see Example 31), and alkoxy and alkylthiolformic acids (see Examples 33 and 34), benzoic acid, carbamic acids (see Example 28), N-benzylcarbamic acid and nicotinic acid and lower-alkane-dioic acids (see Example 29). Aldehydes and ketones from which oxazolidine derivatives can be derived include, for purposes of illustration but without limitation, formaldehyde (see Example 35), acetaldehyde, acetone and methyl ethyl ketone.

The point of attachment of the β-hydroxyphenethylamino side chain to the polyhetero-monocyclicaryl group must be to an available carbon or nitrogen position. The preferred point of attachment is to a carbon atom which is adjacent to a nitrogen atom of the heterocyclic ring which would include: the 2, 4, and 5 positions of the imidazole; the 2 and 4 positions of the oxazole, pyrimidine and thiazole rings; the 2 position in the 1,3,4-oxadiazole and 1,3,4-thiadiazole rings; the 3 position of isoxazole and isothiazole rings; the 3 and 5 positions of the pyrazole ring; the 4 position of the 1,2,3-triazine ring; the 3, 5 and 6 positions of the 1,2,4-triazine ring; the 3 position of the pyridazine ring; and, the 2 position of the pyrazine ring.

For purposes of illustration, but without limitation, the β-carbon to which the phenyl moiety is attached has been further substituted by an ethyl radical (see Example 14), and a phenyl radical (see Examples 15 and 16), and the α-carbon of the ethyl chain has been substituted by a methyl radical (see Example 13). The embodiments of such structural concepts have been tested and found to exhibit the same use characteristics as asserted herein for the embodiments of the aforesaid fundamental concept and are to be considered full equivalents of this concept.

Representative N - (polyhetero - monocyclicaryl) - β - hydroxyphenethylamines that are suitable examples of the composition aspect of this invention include for purposes of illustration, but without limitation: 2-(β-hydrodroxy-β-methylphenethylamino)-1,3,4-thiadiazole; 3-(β-hydroxyphenethylamino)-4-methylpyrazole; 2-(β-hydroxy-3,4-methylenedioxyphenethylamino)-oxazole; 3-(β-hydroxy-β-phenyl-4 - aminophenethylamino) - 1,2,4-oxadiazole; 4 - (β-hydroxy-β-ethylphenethylamino)-2-methoxyimidazole; 3-(β-hydroxyphenethylamino)-isoazole; 2-(β - hydroxy-β-n-butylphenethylamino)-5-aminothiazole; 3 - (β - hydroxy - 4 - chlorophenethylamino) - 5 - methylthio - 1,2,4 - triazole; 2-(β-hydroxy-β-n-butylphenethylamino) - thiazole; 4 - (β - hydroxy-β-isopropylphenethylamino) - 1,2,3-triazine; 2-(β-hydroxy-4-trifluoromethylphenethylamino)-s-triazine.

Synthesis of the (N-polyhetero-monocyclicaryl)-β-hydroxyphenethylamines of the present invention may be described as a process in which a polyhetero-monocyclicaryl moiety is linked with an appropriate β-hydroxyphenethyl group through an otherwise unsubstituted trivalent nitrogen atom which may be pre-attached to either of the groups to be linked. This generalized process is illustrated by: (1) the reaction of a polyhetero-monocyclicaryl derivative with an appropriate β-hydroxyphenethylamine:

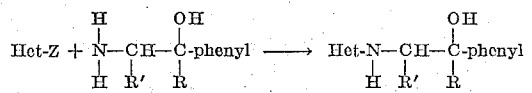

wherein Z=halo, mercapto, lower-alkylthio and methylsulfonyl, R, R' and Het have the same meaning as in the above generalized structure I; (2) by reaction of a polyhetero-monocyclicarlyamine with an appropriate styrene oxide or a potential styrene oxide such as halohydrin:

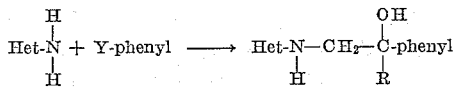

wherein

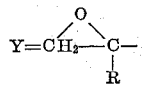

or

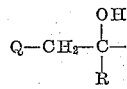

Q=halogen and R and Het have the same meaning as in the above generalized structure I; and (3), by reaction of a polyhetero-monocyclicarylamine with a phenylglycolic acid esterifying agent, to yield an amide and subsequent reduction of the amide:

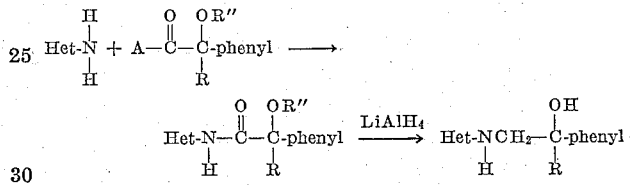

wherein R''=H or acyl, A=halo, hydroxy, acyloxy or alkoxy and R and Het have the same meaning as in the above generalized structure I.

In the above described syntheses, it will be apparent to those skilled in the art of chemistry that the proportion of reactants, duration of reaction, solvents, acid acceptors, catalysts, etc., can be varied depending on the type of reactant.

From the specific reaction conditions given in Examples 7–8, 13–17, 19–26, 36, 40–42 and 45, it will be obvious to those skilled in the art of chemistry that the reagents and conditions which can be employed in the inventive process of reaction (1) will depend almost entirely on the nature of Het-Z. However, the following will illustrate the general range of reagents and conditions which are useful:

*Solvents.*—Hydrocarbon solvents such as benzene, toluene and xylene; alcohols and aqueous alcohols; and other polar solvents, such as acetone, water, acetonitrile and dimethylformamide; or, the reaction may be carried out in the absence of solvent.

*Acid acceptors.*—None, when Z equals mercapto and alkylthio; otherwise: at least one equivalent excess of the β-hydrovyphenethylamine; hindered tertiary amines such as triethylamine, tripropylamine, tributylamine, diisopropylethylamine; and, inorganic bases such as sodium carbonate, potassium carbonate, sodium hydroxide and potassium hydroxide.

*Temperature.*—Reaction temperatures may range up to 200 degrees centigrade.

*Catalysts.*—Occasionally a catalyst is required, such as copper powder, cupric salts, sodium iodide and potassium iodide.

In general, it is preferred that the process of reaction (2) be carried out in the presence of at least one equivalent of a strong basic reagent as illustrated in Example 47. The basic reagent converts the polyhetero-monocyclicarylamine to its anion which is the species that undergoes the reaction with styrene oxide. The range of reagents and conditions which can be used are illustrated by the following:

*Basic condensing agents.*—Sodium amide, potassium amide, lithium amide, butyl lithium, phenyl lithium, sodium hydride and lithium hydride, sodium ethoxide or potassium t-butoxide.

Solvents—
(a) When the basic amides are used: liquid ammonia; ethers such as ethylene glycol dimethyl ether, tetrahydrofuran, mixtures of tetrahydrofuran with the other solvents, and dioxane; benzene and toluene.
(b) When the basic alkoxides are used: alcohols; and ethers illustrated by those above.
(c) When phenyl lithium, butyl lithium and the hydrides are used: ethers as illustrated above and ethyl ether.

*Temperature.*—Reaction temperatures can range between —30 degrees and 150 degrees centigrade.

Although it would be expected that substitution of the ring nitrogen would occur in the absence of a basic agent, it has been an unexpected finding that a certain limited number of polyhetero-monocyclicarylamines can be caused to react with a styrene oxide or styrene halohydrin, in the absence of any basic condensing agent, to yield the N-(polyhetero-monocyclicaryl)-β-hydroxyphenethylamines of the invention. For this reaction to proceed as desired, the polyhetero-monocyclicarylamine must be selected from the group consisting of 2- and 4-aminopyrimidine, amino-s-triazine and 2-aminothiazole. This novel process, which apparently involves initial substitution at the ring nitrogen followed by ring opening and rearrangement, provides the end product more conveniently, and in reasonable yield, as shown in Examples 9–11 and 18. To illustrate, a 32 percent yield of 2-(β-hydroxyphenethylamino)-pyrimidine can be obtained by reaction of 2-aminopyrimidine with styrene oxide in the absence of a basic reagent (see Example 10), whereas a maximum yield of 5 percent of the same product was obtained when the general reaction of process (2) was performed using the 2-aminopyrimidine anion produced by reaction with sodamide. The general range of reagents and conditions which can be used are illustrated as follows:

*Catalysts.*—A catalytic amount of acid can be used, but neither acid or basic catalysts are necessary.
*Solvents.*—No solvent; solvents such as alcohols, dimethylformamide, acetone, acetonitrile.
*Temperature.*—Reaction temperatures may vary between 30 and 180 degrees centigrade.

The preferred conditions involve the boiling of the reactants in alcohol followed by the heating of the crude product mixture at 100–150 degrees for 2 to 5 hours (see Example 10).

From the specific reaction conditions given in Examples 1–6, 12, 46 and 48–51 it will be obvious to one skilled in the art that the reagents and conditions which can be employed for the amide formation in the inventive process of reaction (3) will depend on the nature of the phenylglycolyl acylating agent used. However, the following will illustrate the general range of reagents and conditions which are useful.

(I) When A equals hydroxy:
  *Solvents.*—No solvent, benzene, toluene or xylene.
  *Temperature.*—Reaction temperatures may range between 30 and 200 degrees centigrade.
(II) When A equals halo:
  *Solvents.*—Benzene, toluene, xylene, pyridine and ether.
  *Acid acceptors.*—At least one equivalent excess of polyhetero-monocyclicarylamine, pyridine, diisopropylethylamine, triethylamine, tripropylamine and tributylamine, sodium carbonate, or sodium hydroxide.
  *Temperature.*—Reaction temperatures may range between 0 and 120 degrees centigrade.
(III) When A equals acyloxy:
  *Solvents.*—None, or as in II.
  *Acid acceptors.*—None, or as in II.
  *Temperature.*—Reaction temperatures may range between 0 and 150 degrees centigrade.
(IV) When A equals lower-alkoxy:
  *Solvents.*—Toluene, xylene, cumene and tetrahydronaphthalene.
  *Base catalysts.*—None; or a trace of sodium, potassium or lithium metal, sodium hydride, or sodium amide.
  *Temperature.*—Same as (I).

Reduction of the amide with lithium aluminum hydride can be performed using the general range of reagents and conditions illustrated by the following:

*Solvents.*—Ether, dimethyl ethylene glycol, tetrahydrofuran, diglyme, dioxane, pyridine, benzene-ether.
*Temperature.*—The reaction temperature can range between 0 and 150 degrees centigrade.

Other agents are known to those skilled in the art of organic chemistry for reducing amides, and, from the foregoing illustration it will be apparent such other agents can be employed to reduce the amide to the N-(polyhetero-monocyclicaryl)-β-hydroxyphenethylamines of this invention, as the full equivalent of the lithium aluminum hydride, hereinbefore described. Reducing agents intended to be included are, for purposes of illustration, but without limiting the generality of the foregoing: a combination of aluminum hydride and aluminum chloride; a combination of sodium borohydride and aluminum chlorodialkoxide; sodium and butanol; and, electrolytic reduction.

Polyhetero-monocyclicaryl reactants which can be used in the appropriate processes are exemplified by the following:

2-halopyrazine
2-, 4- and 5-haloimidazole
3-halopyridazine
3-haloisoxazole
3-haloisothiazole
2-halo-1,3,4-oxadiazole
3- and 5-halo-1,2,4-oxadiazole
4-halo-1,2,3-oxadiazole
2- and 4-halooxazole
3- and 5-halopyrazole
2-halo-1,3,4-thiadiazole
3- and 5-halo-1,2,4-thiadiazole
4-halo-1,2,3-thiadiazole
3- and 5-halo-1,2,4-triazole
4- and 5-halo-1,2,3-triazole
2-halo-s-triazine
3-, 5- and 6-halo-1,2,4-triazine
4-halo-1,2,3-triazine wherein halo is chloro, bromo and iodo. The corresponding amino, thio, methylsulfonyl and lower-alkylthio derivatives can be used in the appropriate processes.

β-Hydroxyphenethylamine reactants which can be used in the appropriate processes are exemplified by the following:

β-hydroxyphenethylamine
β-hydroxy-β,β-diphenylethylamine
β-hydroxy-β-ethylphenethylamine
β-hydroxy-β-benzylphenethylamine
β-hydroxy-β-s-butylphenethylamine
β-hydroxy-4-trifluoromethylphenethylamine
β-hydroxy-4-methoxyphenethylamine
β-hydroxy-4-hydroxyphenethylamine
β-hydroxy-3-hydroxyphenethylamine
β-hydroxy-3,4-dihydroxyphenethylamine
β-hydroxy-3,4-methylenedioxyphenethylamine
β-hydroxy-2-methyl-3,4-dihydroxyphenethylamine Styrene oxide or potential styrene oxide reactants which can be used in the appropriate processes are exemplified by the following:

Styrene oxide
4-chlorostyrene oxide
3,4-dichlorostyrene oxide 4-acetamidostyrene oxide
β-hydroxyphenethyl chloride Phenylglycolic acid derivatives which can be used in the appropriate processes are exemplified by the following:

O-acetylmandelic acid anhydride
O-acetylmandelyl chloride
O-butyryl-p-trifluoromethylmandelyl chloride
α-Butylmandelic acid
O-propionyl-p-nitromandelyl chloride
p-Methylmandelyl chloride
Methyl benzilate
Benzilic acid anhydride All reactants are known compounds or can be prepared by known methods.

The hydroxy compounds of this invention can be converted to their ester derivatives with a suitable esterifying agent. Such agents employed are: acids, such as formic acid; acyl chlorides, as benzoyl chloride, ethyl chloroformate and ethyl chlorothiolformate; alkanoic anhydrides, as acetic anhydride, propionic anhydride and butyric anhydride; lower-alkane-di-oic anhydrides, as succinic anhydride and maleic anhydride; potassium cyanate; lower-alkylisocyanates, as methyl, ethyl, propyl and butyl isocyanates; N,N-dialkylcarbamyl chlorides, as N,N-dimethyl-, N,N - diethyl- and N,N - diisopropylcarbamyl chloride.

Alternatively, the carbamate esters of the N-(poly-heteromonocyclicaryl)-β-hydroxyphenethylamines of this invention can be formed by reacting a hydroxy substituted N-(poly-hetero-monocyclicaryl)-phenethylamine with phosgene and treating the intermediate with ammonia or a suitable primary or secondary amine.

The free bases can be used as such or in the form of their crystalline acid addition salts. The acid addition salts are the full equivalents of the free bases, and can be prepared by reacting the corresponding free base in a conventional manner with an inorganic acid as hydrochloric, hydrobromic, sulfuric and phosphoric; or an organic acid, as methanesulfonic, ethanesulfonic, ethanedisulfonic, cyclohexylsulfamic, formic, maleic, citric, tartaric, and tannic acids.

The manner of making and using the compositions and processes of our invention is further illustrated by the following examples, which set forth the best mode contemplated by us of carrying out the invention so as to enable any person skilled in the art of chemistry to make and use the same.

The temperatures herein stated are in degrees centigrade.

EXAMPLE 1

*2-(O-acetylmandelamido)-thiazole*

A solution of 42.5 grams (0.2 mole) of acetylmandelyl chloride in 100 milliliters of dry ether is added dropwise to a cold, stirred solution of 20.0 grams (0.2 mole) of 2-aminothiazole and 20.5 grams (0.2 mole) of triethylamine in 250 milliliters of dry ether. After the addition is complete, the reaction mixture is stirred for 2 hours longer as it warms to room temperature. The precipitated solid is washed with water and then crystallized from isopropyl alcohol to give 39 grams or an 83 percent yield of 2-(O-acetylmandelamido)-thiazole melting at 148–149 degrees.

*Analysis.*—Calculated for $C_{13}H_{12}N_2O_3S$: C, 56.51; H, 4.38; S, 11.60. Found C, 56.68; H, 4.26; S, 11.51.

EXAMPLE 2

*2-(O-acetylmandelamido)-1,3,4-thiadiazole*

A solution of 15.0 grams (0.15 mole) of 2-amino-1,3,4-thiadiazole and 34.0 grams (0.16 mole) of acetylmandelyl chloride in 250 milliliters of dry pyridine is stirred for 2.5 hours at room temperature. Concentration of the solution leaves a thick viscous oil which is dissolved in chloroform. The chloroform solution is washed with water, dried, and the chloroform removed in vacuo to yield a thick glass which is crystallized from isopropyl alcohol to give 35.8 grams or an 86 percent yield of 2-(O-acetylmandelamido)-1,3,4-thiadiazole, melting at 179–180 degrees.

*Analysis.*—Calculated for $C_{12}H_{11}N_3O_3S$: C, 51.96; H, 4.00; S, 11.55. Found: C, 52.14; H, 4.17; S, 11.60.

EXAMPLE 3

*3-mandelamido-1,2,4-triazole*

In a flask fitted with a stirrer and a Dean-Stark moisture trap is placed 20.2 grams (0.24 mole) of 3-amino-1,2,4-triazole, 37.0 grams (0.24 mole) of mandelic acid and 150 milliliters of xylene. The mixture is stirred and heated in an oil-bath at a bath temperature of 175–180 degrees for 9 hours during which time 4.2 milliliters or a 97 percent yield of water is collected. The brown precipitate is removed from the cooled reaction mixture and the mother liquor diluted with hexane to give an additional small amount of material. Crystallization of the combined precipitates from methanol affords 36.8 grams or a 71 percent yield of 3-mandelamido-1,2,4-triazole melting at 216–217 degrees.

*Analysis.*—Calculated for $C_{10}H_{10}N_4O_2$: C, 55.02; H, 4.62; N (basic), 6.42. Found: C, 55.04; H, 4.81; N, (basic), 6.39.

EXAMPLE 4

*4-mandelamido-1,2,4-triazole*

Essentially as described in Example 3, 12.5 grams (0.15 mole) of 4-amino-1,2,4-triazole is reacted with 22.8 grams (0.15 mole) of mandelic acid in 150 milliliters of xylene to give, after two recrystallizations from isopropyl alcohol, 9.3 grams or a 28 percent yield of 4-mandelamido-1,2,4-triazole melting at 183–185 degrees.

*Analysis.*—Calculated for $C_{10}H_{10}N_4O_2$: C, 55.02; H, 4.62; N (basic), 6.42. Found: C, 55.17; H, 4.49; N (basic), 6.25.

The compound of this example is an anti-inflammatory agent. The anti-inflammatory activity of the compound is tested using a modification of the procedure of Contu et al., (Rev. Canad. Biol. 12:40, 1953). A 10 percent suspension of mustard powder is injected into a rat's foot. This produces a gross edema within 30 minutes after injection which slowly subsides within 24 hours (acute stage). During the next several days the swelling and inflammation recur (chronic phase). The test compound is administered subcutaneously for 3 days prior to the test and for 3–5 days after mustard edema. The amount of edema is determined by measuring the change in volume of a measured portion of the edematous foot. Controls are run using the same procedure except that only normal saline is injected. The volume of the foot is measured daily for seven days, and the percentage increase or decrease in edema produced by the test compound is calculated on the basis of the change in volume of the treated versus the control animals. The compound, 4-mandelamido-1,2,4-triazole, shows an average decrease in edema of 71 percent in the acute phase and an average decrease of 91 percent in the chronic phase after a subcutaneous dose of 20 milligrams per kilogram of body weight. Cortisone acetate in the same dose produces a decrease in edema of 35 percent in the acute phase and a decrease in edema of 45 percent in the chronic phase.

EXAMPLE 5

*4-mandelamido-3,5-dimethyl-1,2,4-triazole*

Essentially as described in Example 3, 25.5 grams (0.23 mole) of 4-amino-3,5-dimethyl-1,2,4-triazole is reacted with 33.5 grams (0.22 mole) of mandelic acid in 200 milliliters of xylene to give, after recrystallization from isopropyl alcohol, 6.3 grams of 4-mandelamido-3,5-dimethyl-1,2,4-triazole melting at 211–212 degrees.

*Analysis.*—Calculated for $C_{12}H_{14}N_4O_2$: C, 58.51; H, 5.73; N (basic), 5.68. Found: C, 58.86; H, 5.69; N (basic), 5.60.

EXAMPLE 6

*2-(O-acetylmandelamido)-pyrimidine*

Essentially as described in Example 2, 26.6 grams (0.28 mole) of 2-aminopyrimidine is reacted with 61.1 grams (0.29 mole) of acetylmandelyl chloride in 250 milliliters of dry pyridine. The reaction mixture is concentrated in vacuo to leave a residue which is washed with water and crystallized from ethyl alcohol to give 66 grams or an 87 percent yield of 2-(O-acetylmandelamido)-pyrimidine melting at 185–186.5 degrees.

*Analysis.*—Calculated for $C_{14}H_{13}N_3O_3$: C, 61.97; H, 4.83; N (basic), 5.16. Found: C, 62.19; H, 5.10; N (basic), 5.11.

EXAMPLE 7

*2-(β-hydroxyphenethylamino)-pyrimidine*

A mixture of 23.1 grams (0.2 mole) of 2-chloropyrimidine, 28.0 grams (0.2 mole) of β-hydroxyphenethylamine, 22.2 grams (0.22 mole) of triethylamine and 35 milliliters of benzene is heated, with stirring, on the steam-bath for 7 hours. The cooled reaction mixture is diluted with approximately 100 milliliters of benzene and the triethylamine hydrochloride filtered off. The benzene filtrate is concentrated to a thick oil which crystallizes from isopropyl alcohol to give 27.6 grams or a 64 percent yield of 2-(β-hydroxyphenethylamino) - pyrimidine melting at 92–93 degrees.

*Analysis.*—Calculated for $C_{12}H_{13}N_3O$: N (basic), 6.51. Found: N (basic), 6.46.

2-(β-hydroxyphenethylamino) - pyrimidine hydrochloride, which is recrystallize dfrom ethyl alcohol, melts at 167–168 degrees.

*Analysis.*—Calculated for $C_{12}H_{14}ClN_3O$: C, 57.25; H, 5.60; Cl, 14.09. Found: C, 57.45; H, 5.47; Cl, 14.06.

EXAMPLE 8

*2-(β-hydroxyphenethylamino)-pyrimidine*

Using essentially the same procedure as described in Example 7, except substituting potassium carbonate for triethylamine, there is obtained a 56 percent yield of 2-(β-hydroxyphenethylamino)-pyrimidine melting at 91–92 degrees.

EXAMPLE 9

*2-(β-hydroxyphenethylamino)-pyrimidine*

To a boiling solution of 570 grams (6 moles) of 2-aminopyrimidine in 3.5 liters of ethyl alcohol is added, with stirring, 864 grams (7.2 moles) of styrene oxide. The addition requires 2.5 hours, after which the mixture is stirred and refluxed for 40 hours. The cooled solution is acidified with an excess of ethereal hydrogen chloride and refrigerated overnight to give 291 grams of material melting at 151–158 degrees. Two recrystallizations from methyl alcohol yield 183 grams of 2-(β-hydroxyphenethylamino)-pyrimidine hydrochloride melting at 167–169 degrees. Admixture with the hydrochloride salt described in Example 7 does not depress the melting point.

*Analysis.*—Calculated for $C_{12}H_{14}ClN_3O$: Cl, 14.09. Found: Cl, 14.12.

EXAMPLE 10

*2-(β-hydroxyphenethylamino)-pyrimidine*

To a boiling solution of 570 grams (6 moles) of 2-aminopyrimidine in 2 liters of ethanol is added 27 milliliters of 37 percent hydrochloric acid (0.3 mole) and then, dropwise with stirring, 864 grams (7.2 moles) of styrene oxide. The solution is boiled under reflux for 30 hours, concentrated in vacuo and the residual oil is heated at 120 to 130 degrees (pot temperature) for 3.5 hours with a slow evolution of ammonia being noted throughout the heating period. The reaction mixture is dissolved in methanol, the solution acidified with ethereal hydrogen chloride and refrigerated. Recrystallization of the resultant precipitate from methanol affords 488 grams or a 32 percent yield of the hydrochloride salt of 2-(β-hydroxyphenethylamino)-pyrimidine melting at 167–169 degrees. Admixture with the product prepared in Example 7 does not depress the melting point.

EXAMPLE 11

*2-(β-hydroxyphenethylamino)-pyrimidine*

An ethanol solution of one equivalent of 2-aminopyrimidine and one equivalent of styrene chlorohydrin is heated under reflux on a steam-bath for 40 hours. The precipitated product is recrystallized from methyl alcohol to yield 2-(β-hydroxyphenethylamino)-pyrimidine in the form of the hydrochloride salt, identical with the hydrochloride salt described in Example 7.

EXAMPLE 12

*2-(β-hydroxyphenethylamino)-pyrimidine*

Essentially as described in Example 46, 2-(O-acetylmandelamido)-pyrimidine, produced as set forth in Example 6, is reduced with lithium aluminum hydride to yield 2-(β-hydroxyphenethylamino)-pyrimidine.

The compounds of Examples 7–12 have utility as interneuronal blocking agents and sedatives. The salt 2-(β-hydroxyphenethylamino)-pyrimidine hydrochloride shows interneuronal blocking activity demonstrated by the measurement of the flexor reflex and linguomandibular reflex of a dog under stimulus by an electronic stimulator. A solution of the hydrochloride salt, when administered intravenously to a dog, in a dose of 25 milligrams per kilogram of body weight, causes a complete block of the flexor and linguomandibular responses. By comparison, phenyramidol and mephenesin, in the same dosage, cause a 75 percent and 50 percent block, respectively, of the flexor reflex response and a 90 percent and 55 percent block, respectively, of the linguomandibular reflex response.

The sedative action of the compounds of these examples is illustrated by a test on dogs. When a solution of the drug is administered intravenously in a dosage of 40 milligrams per kilogram of body weight, the dogs exhibit a general anesthesia for a period of 6 minutes with an additional 10 minutes required for recovery. By comparison, the following table shows other commonly used sedative agents and their action under similar conditions:

| Drug | Acute dose mg./kg. | Route | Average time (min.) of— | |
|---|---|---|---|---|
| | | | Anesthesia | Recovery |
| Pentobarbital | 35 | Intravenous | 180 | >240 |
| Hydroxydione | 50 | do | 23 | 30 |
| Thiopental | 40 | do | 40 | 105 |

In addition, the hydrochloride salt has been used in man, in an intravenous dosage ranging between 200 and 400 milligrams, for the induction of anesthesia.

EXAMPLE 13

*2-(β-hydroxy-α-methylphenethylamino)-pyrimidine*

A mixture of 8.0 grams (0.07 mole) of 2-chloropyrimidine, 21.2 grams (0.14 mole) of *dl*-norephedrine and 35 milliliters of toluene is heated on a steam-bath, with stirring, for 4 hours. The cooled mixture is diluted with benzene and the precipitate of *dl*-norephedrine hydrochloride removed by filtration. The filtrate is concentrated to a thick oil that crystallizes from isopropyl alcohol to give 7.7 grams or a 48 percent yield of 2-(β-hydroxy-α-methylphenethylamino)-pyrimidine melting at 123–124 degrees.

*Analysis.*—Calculated for $C_{13}H_{15}N_3O$: N (basic), 6.11. Found: N (basic), 6.09.

Treatment of a benzene-ether solution of the base with excess ethereal hydrogen chloride and recrystallization of the precipitate from isopropyl alcohol yields 2-(β-hydroxy-α-methylphenethylamino)-pyrimidine hydrochloride in the form of colorless crystals melting at 165–166 degrees.

*Analysis.*—Calculated for $C_{13}H_{16}ClN_3O$: C, 58.78; H, 6.07; Cl, 13.34. Found: C, 58.66; H, 5.98; Cl, 13.15.

The compounds of this example have utility as interneuronal blocking agents. Central nervous system depression is further illustrated by a decrease in voluntary or stimulated motor activity.

A solution of the salt, 2-(β-hydroxy-α-methylphenethylamino)-pyrimidine hydrochloride, when administered intravenously to dogs in a dose of 10 milligrams per kilogram of body weight produces a 70 percent decrease of the flexor reflex response and a 34 percent decrease of the linguomandibular reflex response.

The central nervous system depressant properties are further illustrated by motor activity tests on mice using a modified method of Dews (Brit. J. Pharmacol. 8: 46 (1953)). The number of movements of the mice after administration of the drug, as compared to the untreated mice, is reflected in a ratio ($R_V$) indicating voluntary motor activity. Another method is to administer a central nervous system stimulant to the animals and then to administer the drug being tested. The ratio of the activity of the stimulated, treated mice to that of the stimulated, untreated mice is expressed by the value ($R_S$) indicating stimulated motor activity. With either ratio, if the R value is greater than 1, the mice are considered stimulated, and if less than 1, they are considered depressed. The hydrochloride salt of this example produces a value $R_V$ of 0.5 after an intraperitoneal dose of 50 milligrams per kilogram of body weight and a value for $R_S$ of 0.6 after a dose of 25 milligrams per kilogram of body weight. By comparison, meprobamate, with the same dose, gives an $R_V$ value of 0.9 and in a dose of 100 milligrams per kilogram of body weight produces an $R_S$ value of 0.3.

EXAMPLE 14

*2-(β-hydroxy-β-ethylphenethylamino)-pyrimidine*

Using the method of Example 7, 2-chloropyrimidine is reacted with β-hydroxy-β-ethylphenethylamine to yield 2-(β-hydroxy-β-ethylphenethylamino)-pyrimidine which melts at 141 degrees.

*Analysis.*—Calculated for $C_{14}H_{17}N_3O$: N (basic), 5.76. Found: N (basic), 5.79.

The hydrochloride salt, which is prepared in the same manner as in Example 7, melts at 155–156 degrees.

*Analysis.*—Calculated for $C_{14}H_{18}ClN_3O$: C, 60.08; H, 6.48; Cl, 12.67. Found: C, 60.73; H, 6.37; Cl, 12.61 (12.33).

EXAMPLE 15

*2-(β-hydroxy-β,β-diphenylethylamino)-pyrimidine*

Using the method of Example 8, 2-chloropyrimidine is reacted with β-hydroxy-β,β-diphenylethylamine to yield 2-(β-hydroxy-β,β-diphenylethylamino)-pyrimidine which melts at 202–203 degrees.

*Analysis.*—Calculated for $C_{18}H_{17}N_3O$: N (basic), 4.81. Found: N (basic), 4.79.

The hydrochloride salt, which is prepared in the same manner as in Example 7 melts at 215 degrees.

*Analysis.*—Calculated for $C_{18}H_{18}ClN_3O$: C, 65.94; H, 5.53; Cl, 10.82. Found: C, 66.35; H, 5.75; Cl. 10.77.

The compounds of this example have utility as interneuronal blocking agents and sedatives. A solution of the salt, 2-(β-hydroxy-β,β-diphenylethylamino)-pyrimidine hydrochloride, in an intravenous dose of 5 milligrams per kilogram of body weight, causes a decrease of 65 percent and 50 percent respectively of the flexor and linguomandibular reflex responses of the dog.

The sedative action of the compounds of this example is demonstrated in the same manner as that shown for the compounds of Examples 7–12. An intravenous dose of 30 milligrams per kilogram of body weight produces sleep for a period of 30–40 minutes in dogs.

EXAMPLE 16

*2-[β-hydroxy-β,β-bis-(4-methoxyphenyl)-ethyl amino]-pyrimidine*

A mixture of 10.4 grams (0.09 mole) of 2-chloropyrimidine, 22.9 grams (0.08 mole) of β-hydroxy-β,β-bis-(4-methoxyphenyl)-ethylamine, 10 grams (0.1 mole) of triethylamine and 65 milliliters of toluene is heated at reflux for 5 hours. The precipitate of triethylamine hydrochloride is removed by filtration, the toluene filtrate concentrated in vacuo and the residue crystallized from isopropyl alcohol to give 19.1 grams, or a 65 percent yield of 2[β-hydroxy-β,β-bis-(4-methoxyphenyl) - ethylamino]-pyrimidine melting at 120–121 degrees.

*Analysis.*—Calculated for $C_{20}H_{21}N_3O_3$: C, 68.36; H, 6.02; N (basic), 3.99. Found: C, 68.45; H, 6.17; N (basic), 3.98.

2-[β-hydroxy-β,β-bis-(4-methoxyphenyl) - ethylamino]-pyrimidine hydrochloride is prepared in a cold ethanol-ether mixture. The product, which is recrystallized, without warming, from an ethanol-ether solution, melts at 123–124 degrees.

*Analysis.*—Calculated for $C_{20}H_{22}ClN_3O_3$: C, 61.93; H, 5.72; Cl, 9.14. Found: C, 61.91; H, 5.60; Cl, 9.12.

EXAMPLE 17

*2-(β,3-dihydroxyphenethylamino)-pyrimidine*

Using the method of Example 7, 2-chloropyrimidine is reacted with β,3-dihydroxyphenethylamine to yield 2-(β,3-dihydroxyphenethylamino)-pyrimidine which is isolated in the form of the solid hydrochloride salt.

EXAMPLE 18

*2-(β-hydroxy-4-chlorophenethylamino)-pyrimidine*

Using the method of Example 9, 4-chlorostyrene oxide is reacted with 2-aminopyrimidine to yield 2-(β-hydroxy-4-chlorophenethylamino)-pyrimidine which is isolated in the form of the solid hydrochloride salt.

EXAMPLE 19

*2-(β-hydroxy-4-methoxyphenethylamino)-pyrimidine*

Essentially as described in Example 16, β-hydroxy-4-methoxyphenethylamine is reacted with 2-chloropyrimidine to give 2-(β-hydroxy-4-methoxyphenethylamino)-pyrimidine melting at 101–103 degrees.

*Analysis.*—Calculated for $C_{13}H_5N_3O_2$: N basic), 5.71. Found: N (basic), 5.67.

2-(β-hydroxy-4-methoxyphenethylamino) - pyrimidine hydrochloride, which is crystallized from isopropyl alcohol, melts at 143–144 degrees.

*Analysis.*—Calculated for $C_{13}H_{16}ClN_3O_2$: C, 55.41; H, 5.72; Cl, 12.58. Found: C, 56.12; H, 5.92; Cl, 12.51.

The compounds of this example have utility as interneuronal blocking agents. Central nervous system depression is further illustrated by a decrease in stimulated motor activity. A solution of the salt, 2-(β-hydroxy-4-methoxyphenethylamino)-pyrimidine hydrochloride, upon intravenous administration of 20 milligrams per kilogram of body weight, causes a 75 percent decrease of the flexor reflex response of a dog and a 50 percent decrease of the linguomandibular reflex response.

The central nervous system depressant properties of the compounds is further reflected in their ability to depress stimulated motor activity. A solution of the salt, 2-(β- hydroxy-4-methoxyphenethylamino) - pyrimidine hydrochloride, by the same test as shown in Example 13, produces an $R_S$ value of 0.61 after a dose of 25 milligrams per kilogram of body weight.

EXAMPLE 20

*2-(β-hydroxy-3,4-dichlorophenethylamino)-pyrimidine*

Using the method of Example 16, β-hydroxy-3,4-dichlorophenethylamine is reacted with 2-chloropyrimidine to give 2-(β-hydroxy-3,4-dichlorophenethylamino)-pyrimidine melting at 138–140 degrees.

*Analysis.*—Calculated for $C_{12}H_{11}Cl_2N_3$: N (basic), 5.22. Found: N (basic), 4.84.

2-(β-hydroxy-3,4-dichlorophenethylamino) - pyrimidine hydrochloride, which is crystallized from alcohol, melts at 198–199 degrees.

*Analysis.*—Calculated for $C_{12}H_{12}Cl_3N_3$: C, 44.95; H, 3.77; Cl (ionic), 11.05; Cl (total), 33.19. Found: C, 44.31; H, 3.67; Cl (ionic), 11.00; Cl (total), 32.95.

EXAMPLE 21

A. *2-chloro-4-trichloromethylpyrimidine*

A mixture of 50.0 grams (0.34 mole) of 2-hydroxy-4-methylpyrimidine hydrochloride, 104 grams (0.5 mole) of phosphorus pentachloride and 100 milliliters (1.1 moles) of phosphorus oxychloride is heated in an oil-bath at 145–155 degrees for 7.5 hours, with stirring. The mixture is decanted from some tar-like material and the excess phosphorus oxychloride removed at steam-bath temperature under moderate vacuum. The dark residue is poured on cracked ice and extracted with ether. Drying and removal of the ether leaves an amber oil that is distilled to give 26.7 grams or a 34 percent yield of 2-chloro-4-trichloromethylpyrimidine as a colorless oil boiling between 102 and 115 degrees at 10 millimeters of mercury pressure. The oil crystallizes in the form of white needles on cooling and melts on warming to room temperature, approximately 30 degrees. Upon recrystallization from hexane, the product melts at 44–46 degrees.

B. *2-(β-hydroxyphenethylamino)-4-trichloromethylpyrimidine*

A mixture of 13.7 grams (0.1 mole) of β-hydroxyphenethylamine and 10.1 grams (0.1 mole) of triethylamine is stirred while 12.0 grams (0.05 mole) of 2-chloro-4-trichloromethyl-pyrimidine is added. The initial reaction is very vigorous and cooling is necessary. The mixture is then warmed on the steam-bath for 0.5 hour and extracted with benzene and chloroform. The triethylamine hydrochloride salt precipitate is removed by filtration and washed with benzene. The benzene-chloroform filtrate, after being washed with 2 percent hydrochloric acid and water, is dried and concentrated in vacuo to give 13 grams of a tan solid, which crystallizes from isopropyl alcohol to give 7.5 grams or a 45 percent yield of 2-(β-hydroxyphenethylamino) - 4 - trichloromethylpyrimidine as a white powder melting at 109–110 degrees.

*Analysis.*—Calculated for $C_{13}H_{12}Cl_3N_3O$: N (basic), 4.22 Found: N (basic), 4.03.

2 - (β - hydroxyphenethylamino) - 4 - trichloromethylpyrimidine hydrochloride, which is recrystallized from isopropyl alcohol, melts at 180–181 degrees. The corrected melting point is 175–176°.

*Analysis.*—Calculated for $C_{13}H_{13}Cl_4N_3O$: C, 42.31; H, 3.55; Cl (ionic), 9.60. Found: C, 42.19; H, 3.52; Cl (ionic), 9.05 (9.69)

EXAMPLE 22

*2-(β-hydroxyphenethylamino)-4-amino-5-nitropyrimidine*

Using the method of Example 7, 4-amino-5-nitro-2-chloropyrimidine is reacted with β-hydroxyphenethylamine to yield 2-(β-hydroxyphenethylamino)-4-amino-5-nitro-pyrimidine which is isolated in the form of the solid hydrochloride salt.

EXAMPLE 23

*2-(β-hydroxyphenethylamino)-4-methylpyrimidine*

A mixture of 8.5 grams (0.07 mole) of 2-chloro-4-methylpyrimidine, 9.5 grams (0.07 mole) of β-hydroxyphenethylamine, 8 grams (0.08 mole) of triethylamine and 50 milliliters of benzene is heated with stirring on the steam-bath for 7 hours. The precipitated triethylamine hydrochloride is removed, the benzene mother liquor is cooled and ethereal hydrogen chloride added. Recrystallization of the resultant precipitate from an isopropyl alcohol-ether mixture yields 4.2 grams of 2-(β-hydroxyphenethylamino)-4-methylpyrimidine hydrochloride melting at 139–140 degrees.

*Analysis.*—Calculated for $C_{13}H_{16}ClN_3O$: C, 58.78; H, 6.07; Cl, 13.35. Found: C, 58.96; H, 6.01; Cl, 13.20.

2-(β-hydroxyphenethylamino)-4-methylpyrimidine, obtained from the hydrochloride salt by treatment with alkali, melts at 70–72 degrees after crystallization from isopropyl alcohol.

*Analysis.*—Calculated for $C_{13}H_{15}N_3O$: N (basic), 6.12. Found: N (basic), 5.96.

The compounds of this example have utility as interneuronal blocking agents. A solution of the salt, 2-(β-hydroxyphenethylamino)-4-methylpyrimidine hydrochloride, upon intravenous administration of 20 milligrams per kilogram of body weight, causes a 60 percent decrease of the flexor reflex response of a dog and a complete block of the linguomandibular reflex response.

EXAMPLE 24

*2-(β-hydroxyphenethylamino)-4,6-dimethylpyrimidine*

A mixture of 18.0 grams (0.13 mole) of 2-chloro-4,6-dimethylpyrimidine, 16.5 grams (0.12 mole) of β-hydroxyphenethylamine, 14.2 grams (0.14 mole) of triethylamine and 100 milliliters of toluene is heated at reflux for 8.5 hours. Work up in a manner similar to that described in Example 7 and recrystallization from hexane gives 12.8 grams or a 44 percent yield of 2-(β-hydroxyphenethylamino)-4,6-dimethyl-pyrimidine melting at 91–93 degrees.

*Analysis.*—Calculated for $C_{14}H_{17}N_3O$: N (basic), 5.76. Found: N (basic), 5.81.

2-(β-hydroxyphenethylamino) - 4,6 - dimethylpyrimidine hydrochloride, which is recrystallized from isopropyl alcohol ether, melts at 108–110 degrees.

*Analysis.*—Calculated for $C_{14}H_{18}ClN_3O$: C, 60.10; H, 6.48; Cl, 12.68. Found: C, 59.94; H, 6.36; Cl, 12.71.

The compounds of this example have utility as interneuronal blocking agents. A solution of the salt, 2-(β-hydroxyphenethylamino)-4,6-dimethylpyrimidine hydrochloride, upon intravenous administration of 20 milligrams per kilogram of body weight, causes a 50 percent decrease of the linguomandibular reflex response of the dog.

EXAMPLE 25

*2-(β-hydroxyphenethylamino)-4-methoxypyrimidine*

Essentially as described in Example 7, 2-chloro-4-methoxypyrimidine is reacted with β-hydroxyphenethylamine. The reaction mixture is dissolved in chloroform and washed with water. The dried chloroform solution is cooled, treated with ethereal hydrogen chloride and then diluted with ether. The precipitate is recrystallized from isopropyl alcohol-ether to yield 2-(β-hydroxyphenethylamino)-4-methoxyprimidine hydrochloride melting at 130–132 degrees.

*Analysis.*—Calculated for $C_{13}H_{16}ClN_3O_2$: C, 55.43; H, 5.72; Cl, 12.58. Found: C, 56.12; H, 6.20; Cl, 12.37.

The compound of this example has utility as a central nervous system depressant as reflected in its ability to decrease motor activity. A solution of the salt, 2-(β-hydroxyphenethylamino) - 4 - methoxypyrimidine hydrochloride, by the same test as shown in Example 13, produces an $R_V$ value of 0.65 after a dose of 50 milligrams per kilogram of body weight and an $R_S$ value of 0.80 after a dose of 25 milligrams per kilogram of body weight.

EXAMPLE 26

2-(β-hydroxyphenethylamino)-5-chloropyrimidine

Using the method of Example 16, 2,5-dichloropyrimidine is reacted with β-hydroxyphenethylamine to yield 2 - (β - hydroxyphenethylamino) - 5 - chloropyrimidine melting at 123–124 degrees.

*Analysis.*—Calculated for $C_{12}H_{12}ClN_3O$: N (basic), 5.62; Cl, 14.20. Found: N (basic), 5.11; Cl, 14.18.

2 - (β - hydroxyphenethylamino) - 5 - chloropyrimidine hydrochloride, which is prepared using the same procedure as in Example 7, melts at 178–179 degrees.

*Analysis.*—Calculated for $C_{12}H_{13}Cl_2N_3O$: C, 50.35; H, 4.58; Cl (ionic), 12.38. Found: C, 50.42; H, 4.63; Cl (ionic), 12.21.

EXAMPLE 27

2-(β-hydroxyphenethylamino)-4-pyrimidinecarboxylic acid

A solution of 17.0 grams (0.1 mole) of silver nitrate in 40 milliliters of deionized water is added to a solution of 6.6 grams (0.02 mole) of 2-(β-hydroxyphenethylamino)-4-trichloromethylpyrimidine in 75 milliliters of glacial acetic acid. The mixture is heated on a steam-bath for 2 hours, the precipitate of silver chloride is removed by filtration, and the filtrate is diluted with 600 milliliters of deionized water to precipitate 4.5 grams of the silver salt of 2-(β-hydroxyphenethylamino)-4-carboxylic acid. The salt is suspended in 20 milliliters of warm ethanol, hydrogen sulfide is bubbled into the mixture, and the silver sulfide precipitate is removed by filtration. The ethanol filtrate is cooled, and the resultant yellow precipitate is recrystallized from ethanol to give 1.5 grams or a 29 percent yield of 2-(β-hydroxyphenethylamino)-4-pyrimidinecarboxylic acid melting at 203–205 degrees.

*Analysis.*—Calculated for $C_{13}H_{13}N_3O_3$: C, 60.22; H, 5.05; N (basic), 5.40. Found: C, 60.28; H, 5.03; N (basic), 5.31.

EXAMPLE 28

2-[β-(N-ethylcarbamyloxy)-phenethylamino]-pyrimidine

To a solution of 8.0 grams (0.04 mole) of the product described in Example 7, in 10 milliliters of benzene, is added 5.7 grams (0.08 mole) of ethyl isocyanate and the mixture is warmed on the steam-bath for 1 hour. The solid mixture, after recrystallization from benzene, gives 6.6 grams or a 63 percent yield of 2-[β-(N-ethylcarbamyloxy)-phenethylamino]-pyrimidine melting at 164–165 degrees.

*Analysis.*—Calculated for $C_{15}H_{18}N_4O_2$: N (basic), 4.89. Found: N (basic), 4.84.

Treatment of an ethyl acetate-benzene solution of the base with excess ethereal hydrogen chloride and concentration in vacuo leaves a yellow oil, which crystallizes from isopropyl alcohol-ether to give 2-[β-(N-ethylcarbamyloxy) - phenethylamino] - pyrimidine hydrochloride hemihydrate in the form of a hygroscopic white powder melting at 101–103 degrees.

*Analysis.*—Calculated for $C_{15}H_{19}ClN_4O_2 \cdot \frac{1}{2}H_2O$: C, 54.30; H, 6.08; Cl, 10.69; $H_2O$, 2.7. Found: C, 53.72; H, 5.82; Cl, 10.40; $H_2O$, 4.2.

The compounds of this example have utility as analgesics, interneuronal blocking agents, and also possess other central nervous system depressant effects. A solution of the salt, 2-[β-(N-ethylcarbamyloxy)-phenethylamino]-pyrimidine hydrochloride, when administered to mice in a dose of 5 milligrams per kilogram of body weight, increases the reaction time 38 percent to pain produced by radiant heat on the hind foot of the mouse.

A solution of the hydrochloride salt, when administered intravenously to dogs in a dose of 20 milligrams per kilogram of body weight, produces a complete block of both the flexor reflex and linguomandibular reflex responses.

The central nervous system depressant properties of the compounds in this example are further illustrated by the motor activity in mice. Using the same tests as shown in Example 13, a solution of the hydrochloride salt, in intravenous doses of 50 milligrams per kilogram of body weight, produces an $R_V$ value of 0.7, and, in doses of 25 milligrams per kilogram, produces an $R_S$ value of 0.5.

EXAMPLE 29

2-(β-hydroxyphenethylamino)-pyrimidine hemisuccinate

To a mixture of 25.2 grams (0.1 mole) of 2-(β-hydroxyphenethylamino)-pyrimidine hydrochloride in 75 milliliters of dry pyridine is added 10.1 grams (0.1 mole) of succinic anhydride. The mixture is stirred overnight at room temperature, heated on a steam-bath for one hour and the pyridine is removed in vacuo to leave a tan solid residue. The residue is crystallized from isopropyl alcohol to yield 23.5 grams or a 74 percent yield of 2-(β-hydroxyphenethylamino)-pyrimidine hemisuccinate melting at 162–163 degrees.

*Analysis.*—Calculated for $C_{16}H_{17}N_3O_4$: C, 60.96; H, 5.43; N, 4.44. Found: C, 61.04; H, 5.34; N, 4.42.

EXAMPLE 30

2-(β-butyroxyphenethylamino)-pyrimidine

To a solution of 15.2 grams (0.07 mole) of 2-(β-hydroxyphenethylamino)-pyrimidine and 9.0 grams (0.09 mole) of triethylamine in 150 milliliters of dry toluene is added, dropwise with stirring and intermittent cooling, 8.6 grams (0.08 mole) of n-butyryl chloride. The reaction mixture is stirred at room temperature for 4 hours, the precipitate of triethylamine hydrochloride is removed by filtration and the toluene filtrate concentrated in vacuo to leave a tan solid residue. The residue is crystallized from isopropyl alcohol to give 14.9 grams or a 75 percent yield of 2-(β-butyroxyphenethylamino)-pyrimidine melting at 93–95 degrees.

*Analysis.*—Calculated for $C_{16}H_{19}N_3O_2$: N (basic), 4.91. Found: N (basic), 4.90.

2-(β-butyroxyphenethylamino)-pyrimidine hydrochloride is obtained from isopropyl alcohol-ether as a hygroscopic solid.

*Analysis.*—Calculated for $C_{16}H_{20}ClN_3O_2$: C, 59.72; H, 6.26; Cl, 11.01. Found: C, 59.54; H, 6.54; Cl, 10.71.

The compounds of this example have utility as interneuronal blocking agents. A solution of the salt 2-(β-butyroxyphenethylamino)-pyrimidine hydrochloride, upon intravenous administration of 20 milligrams per kilogram of body weight, causes a complete block of both the linguomandibular and flexor reflex responses.

EXAMPLE 31

2-(β-formoxyphenethylamino)-pyrimidine

A solution of 50.0 grams of 2-(β-hydroxyphenethylamino)-pyrimidine in 90.0 milliliters of 98 percent formic acid is heated on the steam-bath for four hours. The reaction mixture is concentrated in vacuo to leave an oil which solidifies when triturated with ice water. The solid is recrystallized from isopropyl alcohol to give 30.0 grams or a 54 percent yield of 2-(β-formoxyphenethylamino)-pyrimidine melting at 113–114 degrees.

*Analysis.*—Calculated for $C_{13}H_{13}N_3O_2$: N (basic), 5.76. Found: N (basic), 5.75.

2-(β-formoxyphenethylamino)-pyrimidine hydrochloride, which is recrystallized from isopropyl alcohol and then from ethyl acetate, melts at 115–117 degrees.

EXAMPLE 32

*2-(β-acetoxyphenethylamino)-pyrimidine*

Using the method of Example 30, 2-(β-hydroxyphenethylamino)-pyrimidine is reacted with acetyl chloride to give 2-(β-acetoxyphenethylamino)-pyrimidine melting at 123–124 degrees.

*Analysis.*—Calculated for $C_{14}H_{15}N_3O_2$: N (basic), 5.45. Found: N (basic), 5.31.

EXAMPLE 33

*2-[β-(ethoxyformoxy)-phenethylamino]-pyrimidine*

Using the method of Example 30, 2-(β-hydroxyphenethylamino)-pyrimidine is reacted with ethyl chloroformate to give 2-[β-(ethoxyformoxy)-phenethylamino]-pyrimidine melting at 105–106 degrees.

*Analysis.*—Calculated for $C_{15}H_{17}N_3O_3$: N (basic), 4.88. Found: N (basic), 4.88.

2-[β-(ethoxyformoxy)-phenethylamino]-pyrimidine hydrochloride, after recrystallization from isopropyl alcohol, melts at 127–130 degrees.

*Analysis.*—Calculated for $C_{15}H_{18}ClN_3O_3$: C, 55.62; H, 5.60; Cl, 10.95. Found: C, 55.27; H, 5.68; Cl, 10.97.

The compounds of this example have utility as interneuronal blocking agents. A solution of the salt, 2-[β-(ethoxyformoxy) - phenethylamino] - pyrimidine hydrochloride, upon administration of 20 milligrams per kilogram of body weight, causes a 50 percent decrease of the flexor reflex response of the dog and a complete block of the linguomandibular reflex response.

EXAMPLE 34

*2-[β-(ethylthiolformoxy)-phenethylamino]-pyrimidine*

Using the procedure of Example 30, 2-(β-hydroxyphenethylamino)-pyrimidine is reacted with ethyl chlorothiolformate to give 2-[β-(ethylthiolformoxy)-phenethylamino]-pyrimidine melting at 111-112 degrees.

*Analysis.*—Calculated for $C_{15}H_{17}N_3O_2S$: N (basic), 4.62. Found: N (basic), 4.61.

2 - [β - (ethylthiolformoxy) - phenethylamino] - pyrimidine hydrochloride, after recrystallization from isopropyl alcohol, melts at 138–140 degrees.

*Analysis.*—Calculated for $C_{15}H_{18}ClN_3O_2S$: C, 53.01; H, 5.34; Cl, 10.43; S, 9.43. Found: C, 53.62; H, 5.76; Cl, 10.36; S, 9.27.

The compounds of this example have utility as interneuronal blocking agents. A solution of the salt, 2-[β-(ethylthiolformoxy)-phenethylamino]-pyrimidine hydrochloride, upon intravenous administration of 20 milligrams per kilogram of body weight, causes a 50 percent decrease of the flexor reflex response of a dog and 75 percent decrease of the linguomandibular reflex response.

EXAMPLE 35

*3-(2-pyrimidyl)-5-phenyloxazolidine*

A mixture of 21.5 grams (0.1 mole) of 2-(β-hydroxyphenethylamino)-pyrimidine, 3.0 grams (0.1 mole) of paraformaldehyde and 150 milliliters of toluene is boiled under reflux in a flask fitted with a Dean-Stark water trap for 3 hours. The toluene solution is concentrated in vacuo to leave a colorless oil which crystallizes from hexane to give 19.5 grams or an 86 percent yield of 3-(2-pyrimidyl)-5-phenyloxazolidine melting at 71–74 degrees.

*Analysis.*—Calculated for $C_{13}H_{13}N_3O$: N (basic), 6.16. Found: N (basic), 6.15.

3-(2-pyrimidyl)-5-phenyloxazolidine hydrochloride, after recrystallization from isopropyl alcohol, melts at 146–149 degrees.

*Analysis.*—Calculated for $C_{13}H_{14}ClN_3O$: C, 59.22; H, 5.35; Cl, 13.45. Found: C, 59.64; H, 5.64; Cl, 13.46.

The compounds of this example have utility as interneuronal blocking agents. A solution of the salt, 3-(2-pyrimidyl)-5-phenyloxazolidine hydrochloride, upon intravenous administration of 10 milligrams per kilogram of body weight, causes an 85 percent decrease of the flexor reflex response of the dog and a complete block of the linguomandibular reflex response.

The sedative action of the compounds of this example is demonstrated in the same manner as that shown for the compounds of Examples 7–12. An intravenous dose of 50 milligrams per kilogram of body weight produces sleep for a period of 5-7 minutes in dogs.

EXAMPLE 36

*4-(β-hydroxyphenethylamino)-2-pyrimidinethiol*

A mixture of 44.0 grams (0.32 mole) of β-hydroxyphenethylamine and 21.6 grams (0.15 mole) of 2,4-pyrimidinedithiol is heated in an oil-bath at 120 degrees for 2.5 hours. The semisolid residue is triturated with benzene, the benzene decanted and the residue is then triturated with acetone. The solid is collected to give 31.8 grams or an 86 percent yield of 4-(β-hydroxyphenethylamino)-2-pyrimidinethiol melting at 191–193 degrees.

*Analysis.*—Calculated for $C_{12}H_{13}N_3OS$: N (basic), 5.67. Found: N (basic), 5.52.

4-(β-hydroxyphenethylamino)-2-pyrimidinethiol hydrochloride, which is recrystallized from a mixture of ethyl and methyl alcohol, melts at 207–209 degrees.

*Analysis.*—Calculated for $C_{12}H_{14}ClN_3OS$: C, 50.78; H, 4.97; Cl, 12.50. Found: C, 50.74; H, 5.21; Cl, 12.54.

EXAMPLE 37

*4-(β-hydroxyphenethylamino)-2-methylthiopyrimidine*

Dimethyl sulfate, 16.5 grams (0.13 mole), is added with stirring to a solution of 31.0 grams (0.12 mole) of the compound obtained in Example 36 in 200 milliliters of water containing 5.2 grams (0.13 mole) of sodium hydroxide. The mixture is stirred for 1.5 hours and the precipitated product filtered off, washed with water and recrystallized from isopropyl alcohol to give 25.0 grams or an 80 percent yield of 4-(β-hydroxyphenethylamino)-2-methylthiopyrimidine as white crystals melting at 124–126 degrees.

*Analysis.*—Calculated for $C_{13}H_{15}N_3OS$: N (basic), 5.36. Found: N (basic), 5.33.

4-(β-hydroxyphenethylamino) - 2-methylthiopyrimidine hydrochloride, which is recrystallized from ethyl alcohol, melts at 209 degrees.

*Analysis.*—Calculated for $C_{13}H_{16}ClN_3OS$: C, 52.43; H, 5.41; Cl, 11.90. Found: C, 52.72; H, 5.38; Cl, 11.93.

EXAMPLE 38

*4-(β-hydroxyphenethylamino)-2-pyrimidinol*

Hydrogen peroxide, 30 percent, in the amount of 15 grams (0.13 mole), is added dropwise with stirring to a cooled solution of 9.3 grams (0.04 mole) of 4-(β-hydroxyphenethylamino)-2-methylthiopyrimidine in 100 milliliters of acetic acid. The solution is allowed to stand for 5 days at room temperature, the mixture is diluted with ether and an excess of ethereal hydrogen chloride is added to precipitate a yellow oil which cannot be crystallized. An aqueous solution of the hydrochloride salt is treated with solid potassium carbonate and the resultant precipitate recrystallized 3 times from a mixture of methyl and ethyl alcohol to give 1.2 grams of 4-(β-hydroxyphenethylamino)-2-pyrimidinol melting at 218–219 degrees.

*Analysis.*—Calculated for $C_{12}H_{13}N_3O_2$: C, 62.33; H, 5.66; N (basic), 6.04. Found: C, 61.89; H, 5.78; N (basic), 6.01.

The compounds of Examples 36–38 show the following pharmacological activities:

| Example | Dose mg./kg. | Percent increase in reaction time to painful stimuli | Interneuronal block percent decrease after a 20 mg./kg. intravenous dose | |
|---|---|---|---|---|
| | | | Flexor reflex | Linguoman. reflex |
| 36 | 5 intravenous | | 75 | 0 |
| 37 | 5 intravenous | | 10 | 100 |
| 38 | 20 intraperitoneal. | 39 | | |

| Example | Dose mg./kg. | Motor activity 50 mg./kg. $R_V$ | Motor activity 25 mg./kg. $R_S$ |
|---|---|---|---|
| 36 | 5 intravenous | 0.7 | 0.7 |
| 37 | 5 intravenous | 0.5 | 0.6 |

EXAMPLE 39

4-(β-hydroxyphenethylamino)-pyrimidine

A stirred mixture of 10.0 grams (0.04 mole) of 4-(β-hydroxyphenethylamino) - 2 - methylthiopyrimidine, prepared as described in Example 37, 15 teaspoonfuls of Raney nickel catalyst (W–2) and 150 milliliters of ethyl alcohol is heated on the steam-bath for 4 hours. The filtered solution is concentrated in vacuo to a white intractable gum which is converted to the hydrochloride salt and recrystallized twice from isopropyl alcohol to give 4.6 grams or a 56 percent yield of 4-(β-hydroxyphenethylamino)-pyrimidine hydrochloride as colorless plates melting at 169–170 degrees.

*Analysis.*—Calculated for $C_{12}H_{14}ClN_3O$: C, 57.25; H, 5.60; Cl, 14.09. Found: C, 56.67; H, 5.52; Cl, 14.05.

Compounds of this example have utility as analgesic agents. A solution of the salt, 4-(β-hydroxyphenethylamino)-pyrimidine hydrochloride, in an intravenous dose of 5 milligrams per kilogram of body weight, increases the reaction time by 26 percent to pain produced by radiant heat on the hind foot of the mouse.

EXAMPLE 40

4-(β-hydroxyphenethylamino)-2-aminopyrimidine

A mixture of 8.0 grams (0.06 mole) of 2-amino-4-chloropyrimidine, 9.0 grams (0.06 mole) of β-hydroxyphenethylamine and 7.0 grams (0.07 mole) triethylamine in 50 milliliters of ethyl alcohol is heated on the steam-bath for 8 hours. The mixture is allowed to cool overnight in a refrigerator after which 1.2 grams of white solid melting at 240–300 degrees is filtered off. The filtrate is concentrated in vacuo on the steam-bath leaving a yellow oil. The oil is dissolved in dilute hydrochloric acid, washed with ether, cooled and made basic with 20 percent sodium hydroxide. The resulting precipitate is collected on a filter, washed with water and recrystallized from isopropyl alcohol to give 5.6 grams, or a yield of 40 percent, of 4-(β-hydroxyphenethylamino)-2-aminopyrimidine melting at 151–152 degrees.

*Analysis.*—Calculated for $C_{12}H_{14}N_4O$: N (basic), 6.08. Found: N (basic), 6.10.

4-(β-hydroxyphenethylamino)-2-aminopyrimidine hydrochloride, which is recrystallized from isopropyl alcohol, melts at 177–178 degrees.

*Analysis.*—Calculated for $C_{12}H_{15}ClN_4$: C, 54.04; H, 5.67; Cl, 13.30. Found: C, 54.31; H, 5.25; Cl, 13.26.

EXAMPLE 41

2-(β-hydroxyphenethylamino)-3-methylpyrazine

A mixture of 18.0 grams (0.14 mole) of 2-chloro-3-methylpyrazine, 18.0 grams (0.13 mole) of β-hydroxyphenethylamine, 23.2 grams (0.14 mole) of potassium carbonate and 0.5 gram of copper powder is heated in an oil-bath maintained at 160 degrees for 7 hours. The mixture is extracted with benzene, the benzene solution is concentrated and the residue is distilled to give 8.3 grams or a 28 percent yield of 2-(β-hydroxyphenethylamino)-3-methylpyrazine that distills between 195 and 201 degrees at 0.5 millimeter of mercury pressure.

*Analysis.*—Calculated for $C_{13}H_{15}N_3O$: N (basic), 6.11. Found: N (basic), 6.06.

2-(β-hydroxyphenethylamino) - 3 - methylpyrazine hydrochloride forms colorless crystals from isopropyl alcohol-ethyl acetate melting at 111–113 degrees.

The compounds of this example have utility as interneuronal blocking agents. A solution of the salt, 2-(β-hydroxyphenethylamino) - 3 - methylpyrazine hydrochloride, upon intravenous administration of a dose of 20 milligrams per kilogram of body weight, causes a complete block of the flexor and linguomandibular reflex responses.

EXAMPLE 42

3-(β-hydroxyphenethylamino)-6-chloropyridazine

A mixture of 38 grams (0.25 mole) of 3,6-dichloropyridazine, 36 grams (0.26 mole) of β-hydroxyphenethylamine and 27.5 grams (0.27 mole) of triethylamine in 200 milliliters of ethanol is heated in an autoclave at 150 degrees for 10 hours. The ethanol solution is concentrated in vacuo. The residue is triturated with water and recrystallized from isopropyl alcohol to give 23.3 grams or a 37 percent yield of 3-(β-hydroxyphenethylamino)-6-chloropyridazine melting at 149–150 degrees.

*Analysis.*—Calculated for $C_{12}H_{12}ClN_3O$: N (basic), 5.61. Found: N (basic), 5.51.

3-(β-hydroxyphenethylamino) - 6 - chloropyridazine hydrochloride, after recrystallization from ethyl alcohol, melts at 185–186 degrees.

*Analysis.*—Calculated for $C_{12}H_{13}Cl_2N_3O$: C, 50.35; H, 4.58; Cl (ionic), 12.39. Found: C, 50.67; H, 4.65; Cl (ionic), 12.37.

EXAMPLE 43

3-(β-hydroxyphenethylamino)-pyridazine

A stirred mixture of 15.0 grams (0.06 mole) of 3-(β-hydroxyphenethylamino)-6-chloropyridazine, 2 grams of 10 percent palladium on carbon and 25 milliliters of 64 percent hydrazine in 200 milliliters of ethyl alcohol is boiled on the steam-bath for 1.5 hours. The cooled mixture is filtered and the filtrate concentrated to leave a tan solid. The solid is washed with water and crystallized from an isopropyl alcohol-water mixture to give 8.8 grams or a 68 percent yield of 3-(β-hydroxyphenethylamino)-pyridazine melting at 141–142 degrees.

*Analysis.*—Calculated for $C_{12}H_{13}N_3O$: N (basic), 6.51. Found: N (basic), 6.50.

3-(β-hydroxyphenethylamino) - pyridazine hydrochloride, after recrystallization from isopropyl alcohol, melts at 122–124 degrees.

*Analysis.*—Calculated for $C_{12}H_{14}ClN_3O$: C, 57.25; H, 5.60; Cl, 14.09. Found: C, 57.53; H, 5.50; Cl, 14.08.

The compounds of this example have utility as analgesic agents. A solution of the salt, 3-(β-hydroxyphenethylamino)pyridazine hydrochloride, in an intravenous dose of 5 milligrams per kilogram of body weight, increases the reaction time by 27 percent to pain produced by radiant heat on the hind foot of the mouse.

EXAMPLE 44

2-(β-hydroxyphenethylamino)-s-triazine

A mixture of 13.8 grams (0.05 mole) of β-hydroxyphenethylguanidine hydrobromide, 4.2 grams (0.05 mole) of s-triazine and 25 milliliters of absolute ethanol is boiled for 20 hours on the steam-bath. The precipitated solid is recrystallized from methanol to give 4.3 grams or a 40 percent yield of 2-(β-hydroxyphenethylamino)-s-triazine melting at 211–212 degrees.

*Analysis.*—Calculated for $C_{11}H_{12}N_4O$: C, 61.10; H, 5.60; N (basic), 6.48. Found: C, 61.46; H, 5.88; N (basic), 6.45.

The compound of this example has utility as an antiinflammatory agent. Using the same procedure as described in Example 4, 2-(β-hydroxyphenethylamino)-s-triazine in a subcutaneous dose of 20 milligrams per kilogram of body weight produces and average decrease in edema of 47 percent in the acute phase and an average decrease in edema of 49 percent in the chronic phase.

EXAMPLE 45

*2-(β-hydroxyphenethylamino)-4,6-diamino-s-triazine*

To a slurry of 72.8 grams (0.5 mole) of 2,4-diamino-6-chloro-s-triazine in 500 milliliters of water is added 71.3 grams (0.52 mole) of β-hydroxyphenethylamine. The slurry is stirred and heated to 90–95 degrees and a solution of 74.4 grams (0.6 mole) of monohydrated sodium carbonate in 160 milliliters of warm water is then added dropwise over a period of one hour. The reaction mixture is stirred and heated for an additional 3 hours, cooled to 15 degrees and filtered. The filter cake is washed with cold water and dried in a vacuum oven at 80 degrees for 4 hours to yield 123 grams of material. The product is recrystallized four times from ethanol to yield 66.7 grams or a 54.3 percent yield of 2-(β-hydroxyphenethylamino)-4,6-diamino-s-triazine melting at 176–178 degrees.

*Analysis.*—Calculated for $C_{11}H_{14}N_6O$: C, 53.64; H, 5.73; N (basic), 5.69. Found: C, 54.00; H, 5.83; N (basic), 5.60.

The compound of this example has utility as an antiinflammatory agent. Using the same procedure as described in Example 4, 2-(β-hydroxyphenethylamino)-4,6-diamino-s-triazine produces an average decrease in edema of 45±11 percent in the acute phase and an average decrease in edema of 67±14 percent in the chronic phase after a subcutaneous dose of 20 milligrams per kilogram of body weight. The compound also produces an average decrease in edema of 26±4 and 44±8 percent during the acute and chronic phases of the test procedure respectively, after an oral dose of 75 milligrams per kilogram of body weight. By comparison, phenylbutazone, in the same dosage, produces an average decrease in edema of 39±6 and 65±3 percent during the acute and chronic phases of the test procedure, respectively.

EXAMPLE 46

*2-(β-hydroxyphenethylamino)-thiazole*

A solution of 35.6 grams (0.13 mole) of 2-(O-acetylmandelamido)-thiazole (Example 1) in 200 milliliters of ethylene glycol dimethyl ether is added, dropwise to a stirred slurry of 11.5 grams (0.3 mole) of lithium aluminum hydride in 300 milliliters of ethylene glycol dimethyl ether. The addition requires 1.5 hours, after which the mixture is refluxed for 30 minutes, cooled and the excess lithium aluminum hydride decomposed by the addition of 30 milliliters of ethyl acetate. Seventy-five milliliters of water is added dropwise, the precipitate of aluminum hydroxide is removed by filtration, and the filtrate concentrated to give a thick yellow oil which solidifies on cooling. The crude product is crystallized from isopropyl alcohol to give 20 grams or a 70 percent yield of 2-(β-hydroxyphenethylamino)-thiazole melting at 96–97 degrees.

*Analysis.*—Calculated for $C_{11}H_{12}N_2OS$: N (basic), 6.36. Found: N (basic), 6.32.

2-(β-hydroxyphenethylamino)-thiazole hydrochloride, after recrystallization from isopropyl alcohol, melts at 161–162 degrees.

*Analysis.*—Calculated for $C_{11}H_{13}ClN_2OS$: C, 51.43; H, 5.10; Cl, 13.80. Found: C, 52.18; H, 5.35; Cl, 13.74.

The compounds of this example are interneuronal blocking agents, central nervous system stimulants and anorexigenic agents. A solution of the salt, 2-(β-hydroxyphenethylamino)-thiazole hydrochloride, upon intravenous administration to dogs in a dose of 25 milligrams per kilogram of body weight produces a complete block of the flexor reflex response and a 50 percent decrease in the linguomandibular response.

The central nervous system stimulant properties are illustrated by the effect of the compounds on motor activity. A solution of the salt, 2-(β-hydroxyphenethylamino)-thiazole hydrochloride, using the test procedure outlined in Example 13 produces an $R_V$ value of 1.5 and an $R_S$ value of 1.78.

The anorexigenic activity is measured using dogs as test animals by comparing food intake with and without drug. The compound reduces food intake by 46 percent during a 5 day test period with an oral dose of 5 milligrams per kilogram of body weight.

EXAMPLE 47

*4-(β-hydroxyphenethylamino)-1,2,4-triazole*

4-amino-1,2,4-triazole, 20.2 grams (0.24 mole), is added, in small portions, to a stirred mixture of 10.2 grams (0.26 mole) of sodium amide in 200 milliliters of liquid ammonia. After the addition is complete, the mixture is stirred for 30 minutes and 29 grams (0.24 mole) of styrene oxide is added dropwise to the stirred reaction mixture. As the liquid ammonia evaporates, it is replaced with ethylene glycol dimethyl ether. In about 3 hours the reaction mixture becomes exceedingly thick and can no longer be stirred. The ethylene glycol dimethyl ether is decanted, the residual gum is dissolved in 5 percent hydrochloric acid and the solution washed with ether. The cold aqueous acid layer is made basic with 20 percent sodium hydroxide, and saturated with potassium carbonate to precipitate a brown solid. The precipitate is washed with a small amount of ice water and recrystallized twice from isopropyl alcohol to give 9.3 grams or a 19 percent yield of 4-(β-hydroxyphenethylamino)-1,2,4-triazole melting at 137–141 degrees.

*Analysis.*—Calculated for $C_{10}H_{12}N_4O$: C, 58.82; H, 5.93; N (basic), 6.86. Found: C, 58.84; H, 6.05; N (basic), 6.80.

EXAMPLE 48

*4-(β-hydroxyphenethylamino)-1,2,4-triazole*

Essentially as described in Example 46, 4-mandelamido-1,2,4-triazole (Example 4) is reduced with lithium aluminum hydride to yield 4-(β-hydroxyphenethylamino)-1,2,4-triazole, identical with the material obtained as described in Example 47.

EXAMPLE 49

*3-(β-hydroxyphenethylamino)-1,2,4-triazole*

Essentially as described in Example 46, 3-mandelamido-1,2,4-triazole (Example 3) is reduced with lithium aluminum hydride in ether to yield 3-(β-hydroxyphenethylamino)-1,2,4-triazole.

EXAMPLE 50

*4-(β-hydroxyphenethylamino)-3,5-dimethyl-1,2,4-triazole*

Essentially as described in Example 46, 4-mandelamido-3,5-dimethyl-1,2,4-triazole (Example 5) is reduced with lithium aluminum hydride in ether to yield 4-(β-hydroxyphenethylamino)-3,5-dimethyl-1,2,4-triazole.

EXAMPLE 51

*2-(β-hydroxyphenethylamino)-1,3,4-thiadiazole*

Essentially as described in Example 46, 2-(O-acetylmandelamido)-1,3,4-thiadiazole (Example 2) is reduced with lithium aluminum hydride in ether to yield 2-(β-hydroxyphenethylamino)-1,3,4-thiadiazole.

The novel compounds of this invention can be combined with solid or liquid pharmaceutical carriers and formulated into the form of tablets, powder packets or capsules or dissolved in suitable solvents for oral and parenteral administration for human and veterinary use.

The invention can be embodied in other specific forms without departing from the spirit or essential characteristics thereof. The foregoing physical embodiments are, therefore, to be considered in all respects illustrative and not restrictive, the scope of the invention being indicated by the appended claims rather than by the foregoing description, and all changes which come within the meaning and range of equivalency of the claims are therefore intended to be embraced therein.

We claim:

1. A chemical compound having the formula

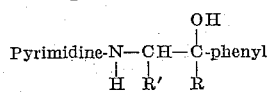

wherein Pyrimidine is the pyrimidine ring, the substituents on the pyrimidine and phenyl rings being selected from the group consisting of hydrogen, halo, lower-alkyl, lower-alkoxy, methylenedioxy, amino, nitro, trihalomethyl, hydroxy, mercapto, lower-alkylthio and carboxy, R is selected from the group consisting of hydrogen, lower-alkyl, benzyl and phenyl and R' is selected from the group consisting of hydrogen and methyl.

2. N-(pyrimidinyl)-β-hydroxyphenethylamine, wherein the attachment of said pyrimidinyl moiety is by a ring carbon atom adjacent to a ring nitrogen atom.

3. 2-(β-hydroxyphenethylamino)-pyrimidine.

4. 2-(β-hydroxy-β,β-diphenylethylamino)-pyrimidine.

5. 2-(β-hydroxyphenethylamino)-4-trichloromethylpyrimidine.

6. 2-(β-hydroxy-β-ethylphenethylamino)-pyrimidine.

References Cited by the Examiner

UNITED STATES PATENTS

| | | | |
|---|---|---|---|
| 2,361,823 | 10/44 | D'Alelio et al. | 260—249.6 |
| 2,368,451 | 1/45 | D'Alelio | 260—249.6 |
| 2,406,591 | 8/46 | D'Alelio | 260—308 |
| 2,406,654 | 8/46 | Bavley | 260—308 |
| 2,493,399 | 1/50 | Garreau | 260—302 |
| 2,502,151 | 3/50 | Horclois | 260—256.4 |
| 2,566,226 | 8/51 | Mackay et al. | 260—249.6 |
| 2,845,425 | 7/58 | Whitehead et al. | 260—256.4 |
| 2,863,874 | 12/58 | Gregory | 260—302 |
| 2,909,421 | 10/59 | Gysin et al. | 71—2.5 |
| 2,946,793 | 7/60 | Michaels et al. | 260—268 |
| 2,976,213 | 3/61 | Murphy | 167—65 |
| 2,979,508 | 4/61 | Jannsen | 260—256.4 |
| 2,994,637 | 8/61 | Bimber | 167—33 |
| 3,004,889 | 10/61 | Kuna et al. | 167—65 |
| 3,006,918 | 10/61 | De Jongh et al. | 260—250 |
| 3,012,032 | 12/61 | Gever | 260—250 |
| 3,040,050 | 6/62 | Biel | 260—256.4 |

OTHER REFERENCES

Burger: Medicinal Chemistry (New York, 1960), pp. 43 and 75–7.

Elderfield: Heterocyclic Compounds, vol. 6 (New York, 1957), pages 271 and 286.

Morton: Chemistry of Heterocyclic Compounds (New York, 1946), pp. V–VI.

IRVING MARCUS, *Primary Examiner.*

DUVAL T. McCUTCHEN, NICHOLAS S. RIZZO,
*Examiners.*